(12) United States Patent
Nakajima

(10) Patent No.: US 10,715,785 B2
(45) Date of Patent: Jul. 14, 2020

(54) ELECTRONIC DEVICE AND METHOD FOR CONTROLLING THE SAME

(71) Applicant: CANON KABUSHIKI KAISHA, Tokyo (JP)

(72) Inventor: Takuro Nakajima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/366,657

(22) Filed: Mar. 27, 2019

(65) Prior Publication Data
US 2019/0306486 A1 Oct. 3, 2019

(30) Foreign Application Priority Data
Mar. 30, 2018 (JP) .................................. 2018-069499

(51) Int. Cl.
H04N 13/189 (2018.01)
G11B 27/00 (2006.01)
H04N 5/232 (2006.01)

(52) U.S. Cl.
CPC ......... H04N 13/189 (2018.05); G11B 27/005 (2013.01)

(58) Field of Classification Search
USPC .......................... 386/230, 239–248, 343–352
See application file for complete search history.

(56) References Cited

U.S. PATENT DOCUMENTS

2017/0018217 A1 1/2017 Ogino et al.
2019/0164330 A1* 5/2019 Sugano .............. G02B 27/0172

* cited by examiner

Primary Examiner — Hung Q Dang
(74) Attorney, Agent, or Firm — Cowan, Liebowitz & Latman, P.C.

(57) ABSTRACT

An electronic device includes: a playback unit which plays back a viewing-direction-changeable moving image; a management unit which stores viewpoint information as a record of a viewing direction in playing back the moving image; and a control unit which carries out control so that a range of the moving image including a viewing direction identical to a viewing direction on a previous playback occasion is extracted and displayed based on the viewpoint information stored in the management unit, in response to predetermined user operation different from an instruction for normal-speed playback and related to playback of the moving image or specification of a playback position in the moving image, and carries out control so that the displaying the range based on the viewpoint information is not performed in response to an instruction for normal-speed playback.

14 Claims, 12 Drawing Sheets

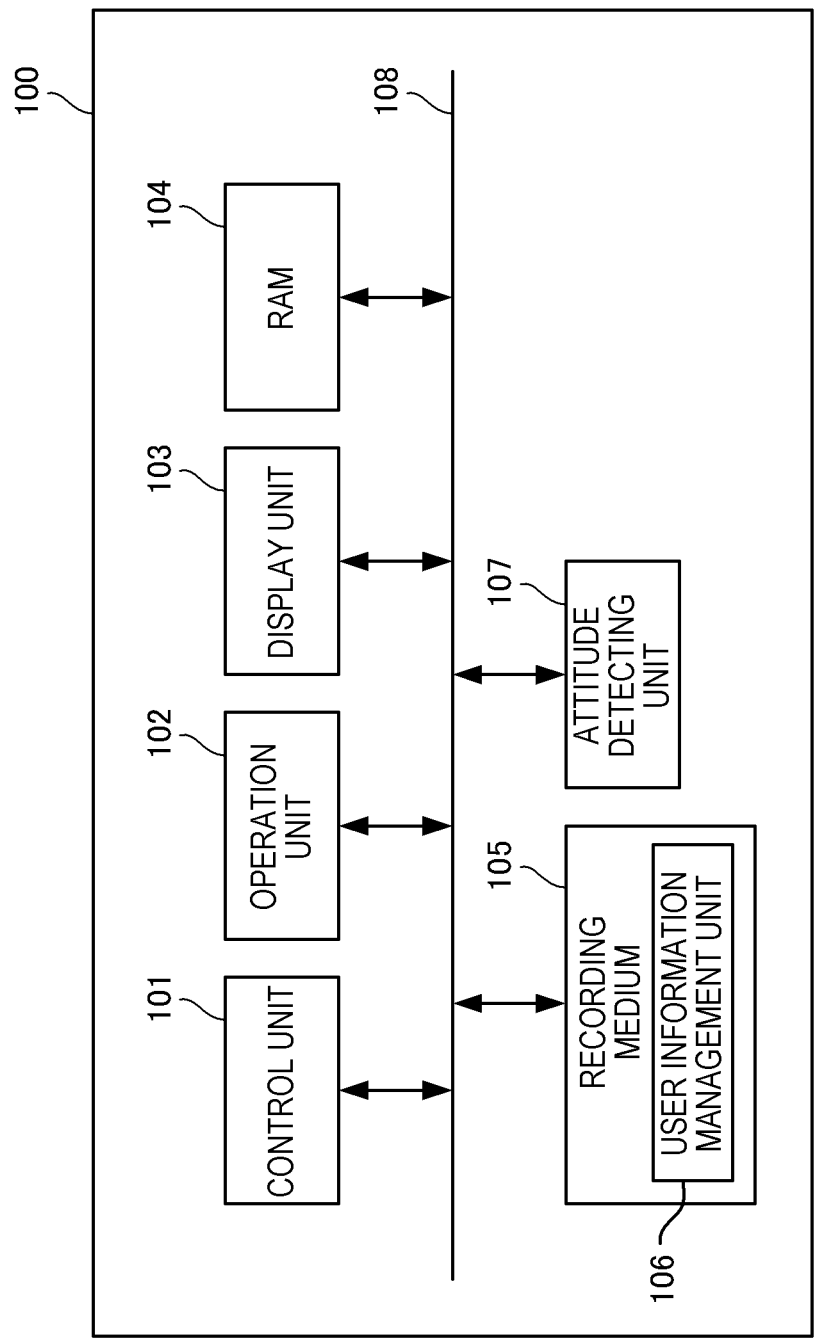

|  | USER ID | VIEWING DIRECTION | PLAYBACK POSITION |
|---|---|---|---|
| USER INFORMATION 1 | aaa | $(\phi, \theta) = (30, 40)$ | 10 SEC |
|  |  | $(\phi, \theta) = (30, 45)$ | 11 SEC |
| USER INFORMATION 2 | bbb | $(\phi, \theta) = (90, 45)$ | 1 SEC |
| USER INFORMATION 3 | ccc | $(\phi, \theta) = (15, 40)$ | 20 SEC |

FIG.8

|  | USER ID | VIEWING DIRECTION | PLAYBACK POSITION |
|---|---|---|---|
| USER INFORMATION 1 | aaa | $(\phi, \theta) = (30, 60)$ | 30 SEC |

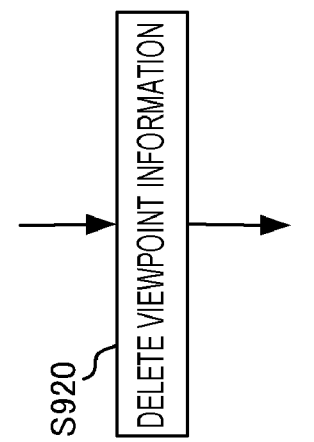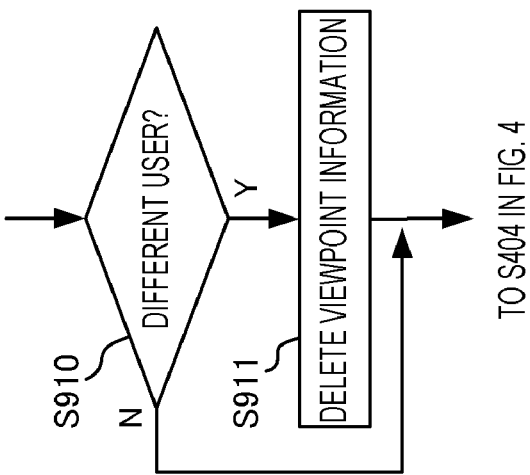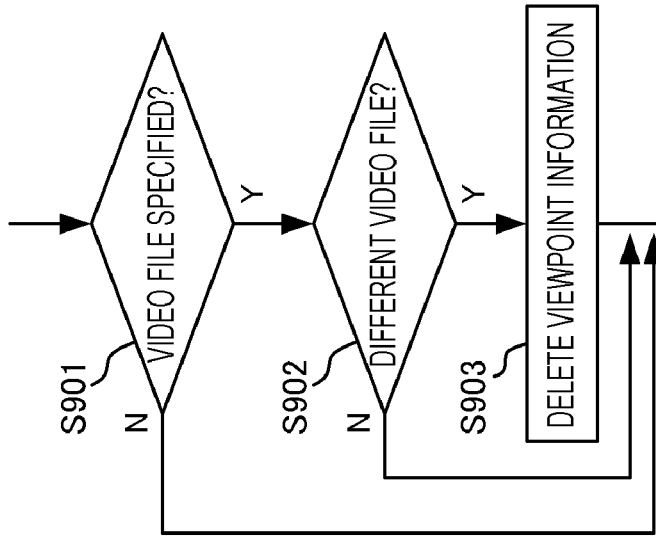

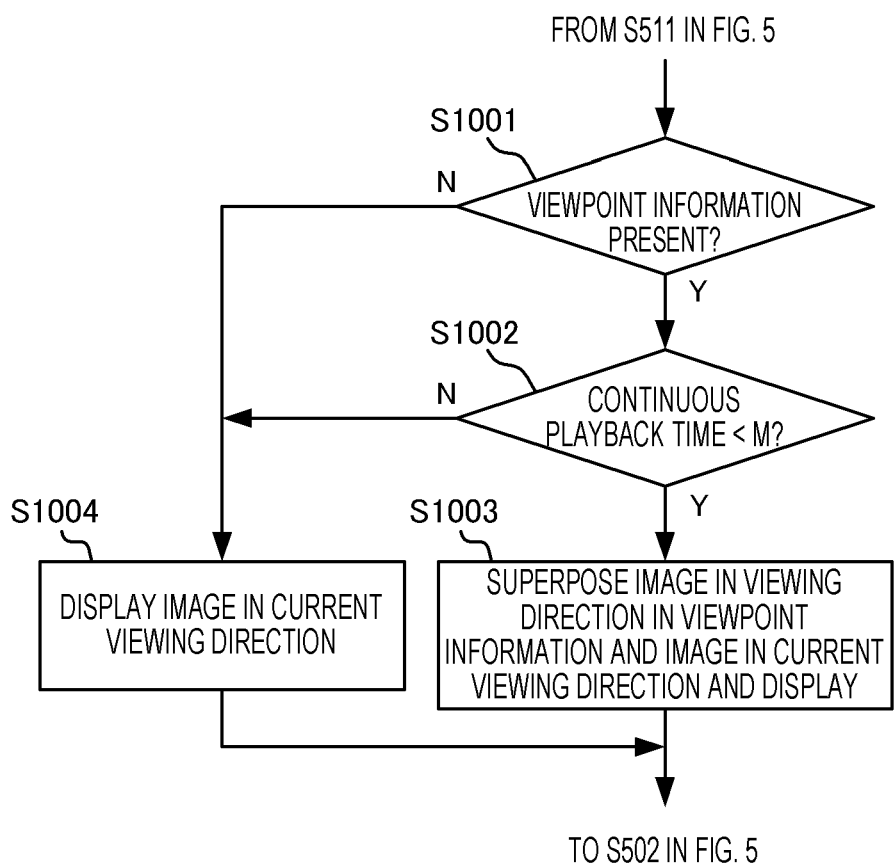

ELECTRONIC DEVICE AND METHOD FOR CONTROLLING THE SAME

BACKGROUND OF THE INVENTION

Field of the Invention

The present invention relates to an electronic device and a method for controlling the same, and more particularly to display of a viewing-direction-changeable video.

Description of the Related Art

In recent years, videos which allow a viewing direction to be arbitrarily changed have become available with the advent of developed video playback techniques. Using the video playback techniques, the user can instinctively view a video from various angles simply by changing the direction of a display control device such as a smartphone and a head-mounted display.

US 2017/0018217 A1 proposes a video display system which detects the direction of the line of sight of the user and displays video data in a predetermined range corresponding to the line-of-sight direction when the user views an image taken by an omnidirectional camera using a head-mounted display (HMD).

According to an approach proposed in US 2017/052690 A1, when an extraction region is arbitrarily specified in any of all the directions in the range of 360° in an omnidirectional video and displayed, a display region to be extracted from the video and displayed is broaden as a set playback speed is higher, so that the content of the video can be more easily understood.

SUMMARY OF THE INVENTION

When the user wants to watch a scene once again in such a video, however, it is not easy to find that particular scene by searching the video. When for example the user tries to find a desired scene while changing the playback position in the video using a seek bar or by search mode playback, the displayed image is not exactly the same if the viewing direction is different from that on the past viewing occasion, and therefore it may be highly likely that the user overlooks the desired scene.

With the foregoing in view, it is an object of the present invention to provide a technique for facilitating or assisting in search for a scene viewed in the past in a viewing-direction-changeable video.

The present invention provides an electronic device comprising a memory and at least one processor and/or at least one circuit to perform the operations of the following units: a playback unit configured to play back a viewing-direction-changeable moving image; a management unit configured to store viewpoint information as a record of a viewing direction used by the playback unit in playing back the moving image; and a control unit configured to carry out control so that a range of the moving image including a viewing direction identical to a viewing direction on a previous playback occasion is extracted and displayed based on the viewpoint information stored in the management unit, in response to predetermined user operation different from an instruction for playback at a normal speed and related to playback of the moving image or specification of a playback position in the moving image, and to carry out control so that the displaying the range based on the viewpoint information is not performed in response to an instruction for playback at the normal speed.

According to the present invention, in a viewing-direction-changeable video, search for a scene viewed in the past can be facilitated or assisted.

Further features of the present invention will become apparent from the following description of exemplary embodiments with reference to the attached drawings.

BRIEF DESCRIPTION OF THE DRAWINGS

FIG. 1 is a diagram illustrating the configuration of an electronic device (a playback device) according to an embodiment of the present invention;

FIG. 8 shows exemplary viewpoint information;

FIGS. 9A to 9C are flowcharts for illustrating a modification of the processing routine for updating viewpoint information;

FIG. 10 is a flowchart for illustrating a processing routine for normal mode playback according to a second embodiment of the present invention;

DESCRIPTION OF THE EMBODIMENTS

Figures 2A, 2B:
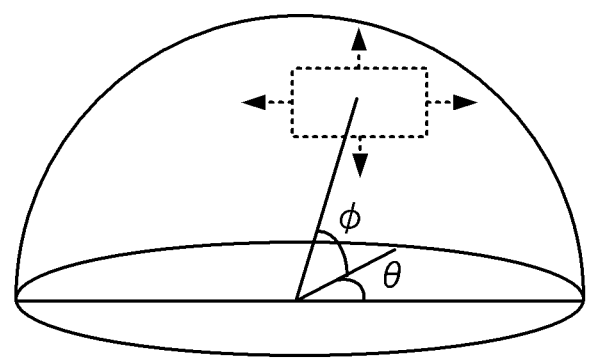
FIG. 2A shows exemplary viewpoint information recorded in a user information management unit.
FIG. 2B is a view illustrating a viewing direction.

Now, preferred embodiments of the present invention will be described in conjunction with the accompanying drawings. The present invention relates to an electronic device having a moving image playback function for playing back a moving image which allows a viewing direction to be arbitrarily switched, a method for controlling the device, and a program for implementing the moving image playback function.

The "moving image which allows a viewing direction to be arbitrarily switched" is a moving image recorded with views in multiple directions at the same time, and the user specifies an arbitrary viewing direction during playback of the moving image, so that an image corresponding to a view in the arbitrary direction can be displayed. The moving image may include a 360-degree video, an omnidirectional video, a VR (virtual reality) video, and a free viewpoint video. Herein, these videos are generically referred to as a "multi-viewpoint video" or a "viewing-direction-changeable moving image." The multi-viewpoint video may be produced by combining, using a computer, video data on views in multiple directions taken simultaneously by multiple cameras or by photographing a super-wide angle view using a special optical system such as a fisheye lens.

First Embodiment

According to a first embodiment of the present invention, when search mode playback is carried out to a multiple-viewpoint video, an image in the current viewing direction and an image in a viewing direction on a previous playback occasion are displayed together by way of illustration.

FIG. 1 is a view of an exemplary configuration of a playback device as an electronic device to which each embodiment of the present invention may be applied. The playback device 100 includes a control unit 101, an operation unit 102, a display unit 103, a RAM 104, a recording medium 105, a user information management unit 106, an attitude detecting unit 107, and a bus 108. Various components connected to the bus 108 are configured to exchange data with one another through the bus 108.

The components of the playback device 100 shown in FIG. 1 will be described.

The control unit 101 carries out overall control of the playback device 100 and various kinds of computing processing and image processing. The control unit 101 has a CPU (processor) for executing programs and may be provided with a cash memory and a processor for image processing (such as a GPU and a DSP) as required.

The operation unit 102 informs the control unit 101 of operation accepted from the user. The user operation includes the following kinds of operation.

To turn on/off the playback device 100 (pressing the power supply on button or the power supply off button).
To select a video file.
To instruct start of normal mode playback (pressing the playback button).
To instruct start of search mode playback (pressing the search button).
To change a playback position with respect to a video being played back (moving the button on the seek bar).
To specify a playback position different from the current playback position with respect to a video being played back (Touching the seek bar).
To change the viewing direction (pressing the cross button).

The display unit 103 displays an image in response to an instruction from the control unit 101. The user can view the video through the display unit 103. The display unit 103 may be a liquid crystal display or an organic EL display or may be a touch panel display which allows input by touch panel operation. The touch panel display may function as the display unit 103 and the operation unit 102. In response to an instruction from the control unit 101 to display a plurality of image data pieces, the display unit 103 may superpose (combine) the specified image data pieces or display the image data pieces side by side.

The RAM 104 is a memory which temporarily stores information. The RAM 104 may store video data to be played back, continuous playback time information to be used during playback, and viewpoint information (a playback position and a viewing direction). The RAM 104 is also used as a working memory when the control unit 101 executes a program.

The recording medium 105 is large-capacity non-volatile storing means. The recording medium 105 may be a hard disk drive, a solid-state drive, and a flash memory. The recording medium 105 may store multi-viewpoint video data, programs to be executed by the control unit 101, and various kinds of data to be used by the programs. Data reading/writing from/to the recording medium 105 is carried out in response to an instruction from the control unit 101.

The attitude detecting unit 107 detects the attitude of the playback device 100 with respect to the gravity direction. Whether the playback device 100 is held horizontally or vertically, made to face upward or downward, or obliquely positioned can be determined on the basis of the attitude detected by the attitude detecting unit 107. The attitude detecting unit 107 may be at least one or a combination of two or more of an acceleration sensor, a gyro sensor, a geomagnetism sensor, and an azimuth sensor.

The playback device 100 may be used as a head-mounted display when mounted at VR goggles. The entire playback device 100 may be inserted into the VR goggles as the display surface of the display unit 103 is positioned to face toward the head band (in other words toward the user) provided to fix the VR goggles to the user's head. In this way, the user puts on the VR goggles mounted with the playback device 100, so that the user may visually recognize the display unit 103 of the playback device 100 while wearing the VR goggles at the head without manually holding the playback device 100. In this case, when the user moves the head or the entire body, the attitude of the playback device 100 changes. The attitude detecting unit 107 detects the change in the attitude of the playback device 100 at the time, and the control unit 101 carries out VR display processing which will be described in response to this attitude change. In this case, detection of the attitude of the playback device 100 by the attitude detecting unit 107 is equivalent to detection of the attitude of the user's head (the direction in which the user's line of sight is directed).

The playback device 100 can VR-display a VR image (a VR content) at the display unit 103. The VR image is an example of the multi-viewpoint video.

The VR image is an image which can be VR-displayed. The VR image may include an omnidirectional image taken by an omnidirectional camera (a 360-degree camera), and a panoramic image having a wider video range (an effective video range) than a display range which can be displayed at a time at the display unit. The VR image (the VR content) includes a VR-displayable image produced by computer graphics (CG) other than images taken by a camera. The VR image may include not only a still image but also a video or a live view image (an image obtained from a camera almost in real time). The VR image has a video range (an effective video range) corresponding to a maximum view field of 360° in the vertical direction (the vertical angle, the angle from the zenith, the elevation angle, the depression angle, and the altitude angle) and 360° in the horizontal direction (the horizontal angle and the azimuth angle). The VR image also includes an image having a view field less than 360° both in the vertical and horizontal directions and a wider angle of view (view field range) than an angle of view photographable by a normal camera or a wider video range (an effective video range) than a range displayable at the display unit at a time. For example, an image taken by an omnidirectional camera capable of photographing an object with a view field (an angle of view) corresponding to 360° in the horizontal direction (the horizontal angle and the azimuth angle) and a vertical angle of 210° around the zenith is a kind of the VR image. More specifically, an image having a video range equal to or greater than a view field of 180° (±90°) in the vertical and horizontal directions and a wider video range than that viewable by a person at a time is a kind of the VR image. When the VR image is VR-displayed, an omnidirectional video which is seamless in the horizontal direction (the horizontal rotation direction) can be viewed as the attitude is changed in the horizontal rotation direction. In the vertical direction (the vertical rotation direction), a seamless omnidirectional video can be viewed in the range of ±105° as viewed from immediately above (from the zenith) and a blank region without a video exists in the range exceeding 105° from immediately above. The VR image may be substantially equivalent to an "image having at least a part of a virtual space (a VR space) as a video range."

The VR display refers to a display-range-changeable display method for displaying a video in a VR image in a view field range corresponding to the attitude of the playback device 100 detected by the attitude detecting unit 107. When the playback device 100 is mounted on VR goggles for viewing, a video in a view field range corresponding to the direction of the face of the user is displayed. For example, assume that in a VR image, a video at an angle of visibility (an angle of view) around 0° in the horizontal direction (in a particular direction such as in the north) and 90° (at 90° from the zenith, in other words in the horizontal direction) is displayed. When the attitude of the playback device 100 is turned to have its front side and rear side reversed (for example by turning the display surface to face the north from the south) from the state, the display range of the same VR image is changed to a video in a view field angle around 180° in the horizontal direction (in the opposite direction such as south) and 90° in the vertical direction (in the horizontal direction). When the user views the playback device 100 mounted on the VR goggles and turns the face to the south from the north (in other words when the user turns back), the video displayed at the playback device 100 changes to a video in the south from the north. The VR display allows the user to visually feel as if the user is in the spot in the VR image (in the VR space) in reality.

The user information management unit 106 is a database provided in the recording medium 105 and serves as means for recording changes in the viewing direction during playback of a multi-viewpoint video on a user-basis. FIG. 2A illustrates the concept of the data structure of user information recorded in the user information management unit 106. According to the embodiment, the user information management unit 106 manages three kinds of information, the "user ID," the "viewing direction," and the "playback position." The "user ID" is information used to identify a user who plays backs (views) a multi-viewpoint video. The "viewing direction" is a record of viewing directions used during playback of a multi-viewpoint video and represented for example by an elevation angle $\phi$ and an azimuth angle $\theta$. As shown in FIG. 2B, the elevation angle $\phi$ is an angle formed by a line of sight and the horizontal plane. Note that strictly speaking, the angle is called a "depression angle" when the line of sight is directed under the horizontal plane ($\phi<0$) but herein the angle is indicated as the "elevation angle" where $\phi<0$. As shown in FIG. 2B, the azimuth angle $\theta$ represents the line-of-sight direction within the horizontal plane in consideration of a celestial sphere around the position of the view point and is an angle between a reference direction and the line-of-sight direction. The reference direction may be determined so that the north corresponds to 0° or on the basis of the attitude or direction of the camera during photographing. The "playback position" is a playback position for a multi-viewpoint video when a viewpoint position is recorded in the user information management unit 106 and represented in time from the start of the video.

Hereinafter, the "viewing direction" and the "playback position" together will be referred as the "viewpoint information." The viewpoint information is history information including a record of viewing directions used during playback (viewing) of a video. As shown in FIG. 2A, a viewing direction is recorded in association with a user ID, so that the history of view point switching carried out by each user in viewing a video can be referred to (reproduced) later. In the following description, the processing for deleting viewpoint information recorded in the user information management unit 106 is carried out, but in this case only the view point information is deleted and the user ID is not deleted.

Processing Routine for Entire Playback Device

Figure 3:
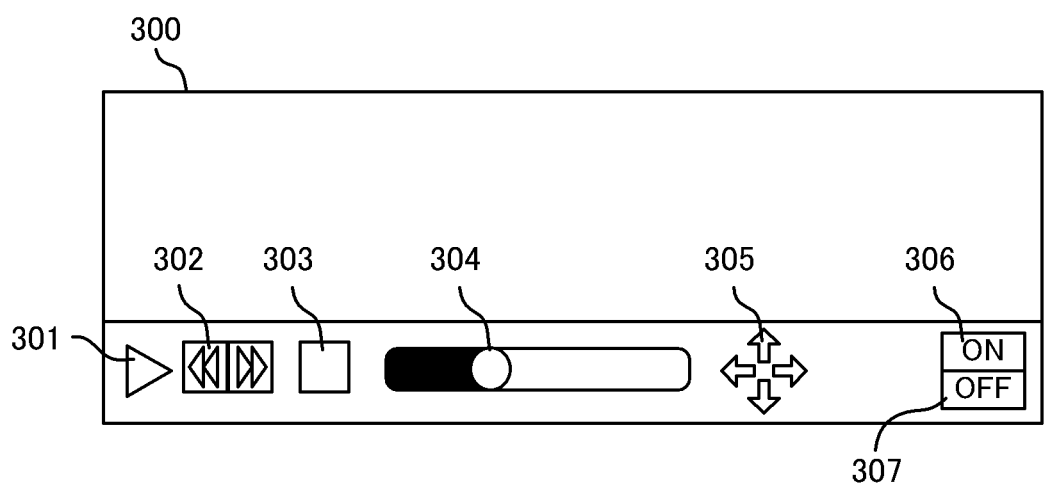
FIG. 3 is a view illustrating an exemplary user interface in the playback device.

FIG. 3 is a view illustrating an exemplary user interface (UI) in the playback device 100 according to the embodiment. The UI 300 in the playback device 100 includes a playback button 301, a search button 302, a stop button 303, a seek bar 304, a cross button 305, a power supply on button 306, and a power supply off button 307. It is assumed that in the playback device 100 according to the embodiment, the UI 300 is displayed on the screen of a touch panel display, while a part of the UI 300 may be formed for example by physical switches.

The playback button 301 is a button used to instruct start of normal mode playback of a video. The search button 302 is a button used to instruct start of search mode playback of a video. Normal mode playback is for a mode (a first playback mode) for playing back a video at a normal playback speed (a speed according to the frame rate of the video) and used in normal viewing. Meanwhile, the search mode playback is for a mode (a second playback mode) for playing back a video at a higher speed than that of normal mode playback (such as 1.5 times to 100 times) and used to search for a scene desired to be viewed. According to the embodiment, search mode playback in the forward direction (referred to as "fast forward") and search mode playback in the reverse direction (referred to as "fast rewinding") may be carried out. The stop button 303 is used to instruct stopping of normal mode playback and search mode playback of a video. The seek bar 304 indicates the progress of playback of the video. The playback position can be changed by moving the button on the seek bar 304 from side to side. The cross button 305 is used by the user to change the viewing direction of the video or select a video file to be played back. The power on button 306 and the power off button 307 are used to turn on/off the power supply of the playback device 100.

When the user operates the UI 300, the operation unit 102 receives a signal depending on the content of operation and notifies the control unit 101 thereof. The user can operate (touch) any of the buttons (touch buttons) of the UI 300 to instruct playback or search of a video.

Figure 4:
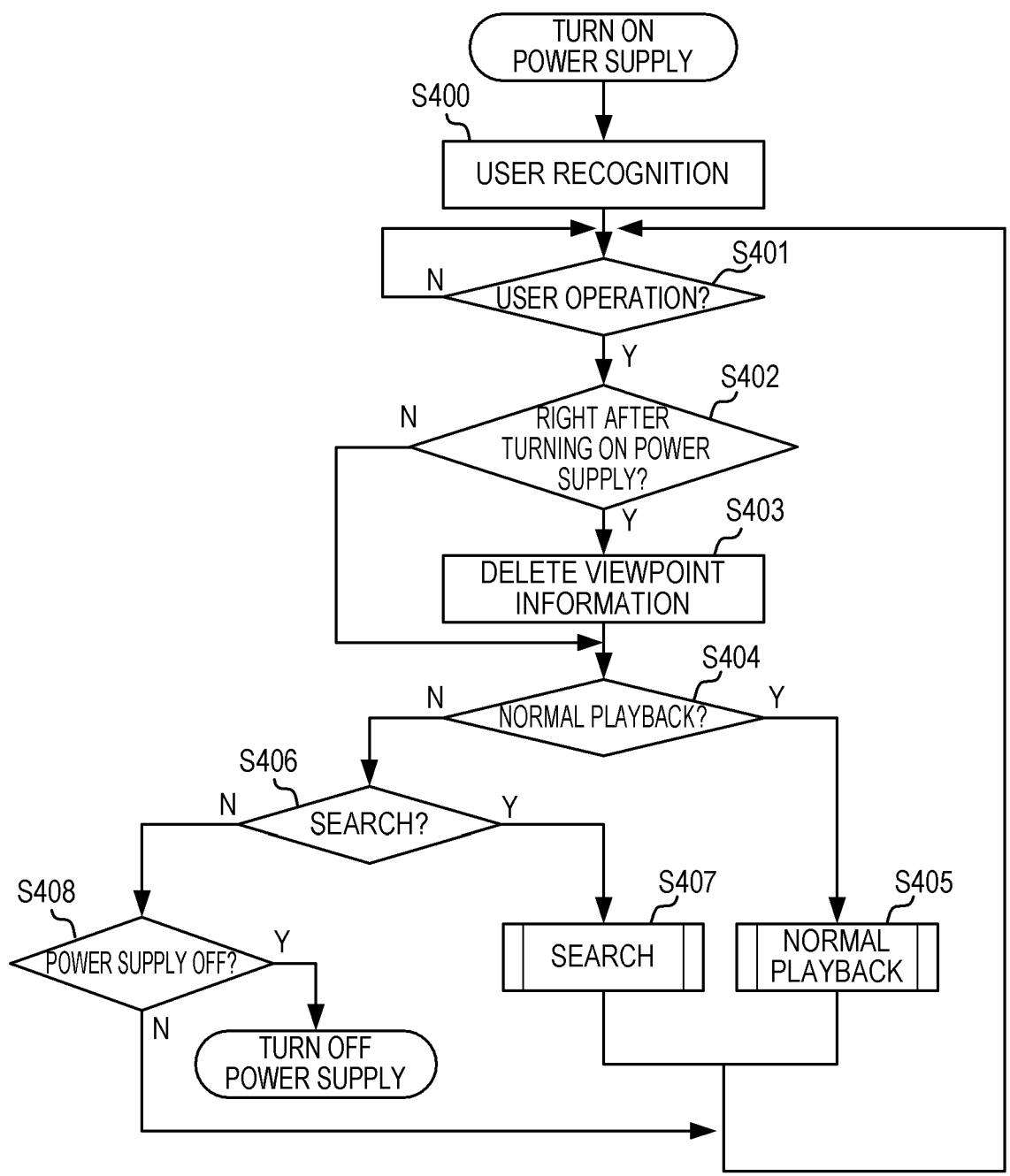
FIG. 4 is a flowchart for illustrating a processing routine for the entire playback device.

FIG. 4 is a flowchart for illustrating a processing routine for the entire playback device according to the embodiment. The processing in FIG. 4 is implemented as the control unit 101 (CPU) evolves a program stored in the recording medium 105 in the RAM 104 and executes the program. More specifically, according to the embodiment, the control unit 101 functions as the playback means and the control means according to the present invention. Note that when the user turns on the power supply of the playback device 100 through the power supply on button 306, the processing in FIG. 4 starts automatically.

In S400, the control unit 101 carries out user recognition processing. The user inputs the user ID in the playback device 100 through an interface which is not shown. A user ID is previously provided to each user. The control unit 101 receives the input user ID from the operation unit 102 and records the user ID in the user information management unit 106. The control unit 101 stores, in the RAM 104, the notified user ID as the user ID of the current user (the user currently operating the playback device 100 (viewing a video)). According to the embodiment, the user ID is input as information for identifying the user, but any other means may be used to identify a user. For example, Biometrics authentication (authentication for example by the face, fingerprints, veins, an iris, and the voice) may be used instead of the user ID.

In S401, the control unit 101 determines whether the user has carried out operation through the UI 300. If there is no operation carried out by the user, S401 is executed again. If there is operation by the user, the control unit 101 receives user operation information from the operation unit 102, and the process proceeds to S402. The user operation information includes selection of a mode instruction (among video normal mode playback, search mode playback, or turning off of the power supply) and selection of a video file to be played back. Unless the mode instruction is about the turning off of the power supply, the user naturally selects a video file to be played back.

In S402 and S403, the control unit 101 updates the viewpoint information recorded in the user information management unit 106. The updating processing for the viewpoint information is a processing carried out to determine whether the recorded viewpoint information is used as it is or deleted.

More specifically, in step S402, the control unit 101 determines whether updating processing has been carried out for the first time after turning on of the power supply. If the updating processing has been carried out for the first time after turning on of the power supply, the process proceeds to S403. Otherwise, the updating processing ends. In step S403, the control unit 101 deletes all the viewpoint information recorded in the user information management unit 106.

As a result of the processing described above, while the power supply is in an on state, the recorded viewpoint information will not be deleted. Note that when there is no viewpoint information recorded in the user information management unit 106, the processing in S402 and S403 may be skipped, and the process may proceed to S404.

In S404, the control unit 101 determines whether the operation accepted in S401 is normal mode playback. If the operation accepted in S401 is normal mode playback (the playback button 301), the process proceeds to S405. If the operation accepted in S401 is not normal mode playback, the process proceeds to S406.

In step S405, the control unit 101 plays back a video file specified in step S401. Detailed processing routine in step S405 will be described later with reference to FIG. 5.

In S406, the control unit 101 determines whether the operation accepted in S401 is search mode playback. If the operation accepted in S401 is search mode playback (the search button 302), the process proceeds to S407. If the operation accepted in S401 is not search mode playback, the process proceeds to S408.

In S407, the control unit 101 carries out search mode playback to the video file specified in S401. The detailed processing routine in S407 will be described later with reference to FIG. 7.

In S408, the control unit 101 determines whether the operation accepted in S401 is turning off of the power supply of the playback device. If the operation accepted in S401 is turning off of the power supply (the power supply off button 307), the control unit 101 turns off the power supply of the playback device. If the operation accepted in S401 is not turning off of the power supply, the process returns to S401, and the control unit 101 again determines the presence/absence of operation from the user.

This concludes the description of the processing routine for the entire playback device.

Processing Routine for Normal Mode Playback and Viewpoint Information Registration Now, with reference to FIG. 5, the processing routine for normal mode playback and the processing routine for viewpoint information registration will be described.

Figure 5:
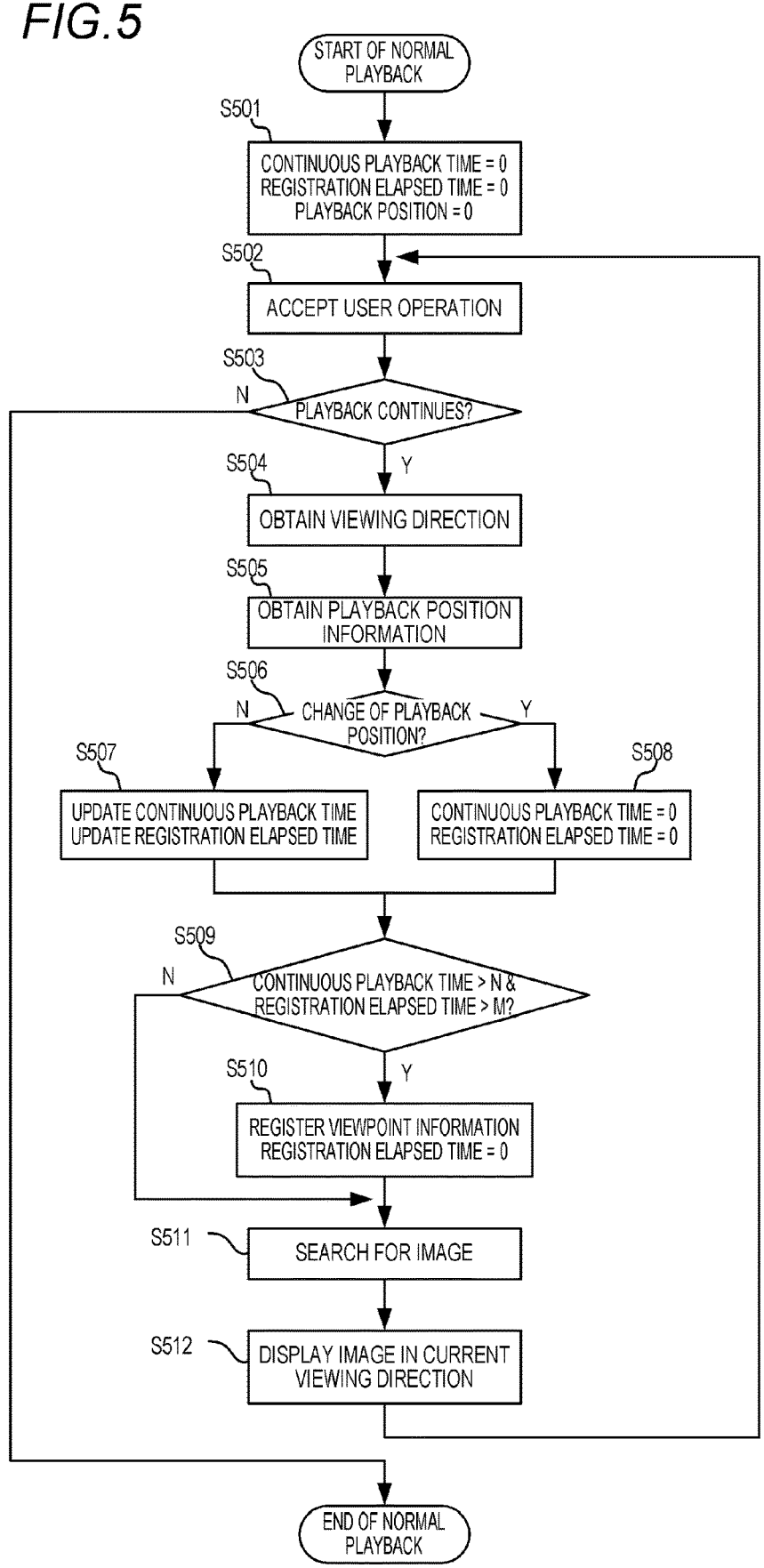
FIG. 5 is a flowchart for illustrating a processing routine for normal mode playback according to a first embodiment of the present invention.

FIG. 5 illustrates the processing routine for normal mode playback.

According to the embodiment, the processing of registering viewpoint information is also carried out during normal mode playback (S509 and S510).

In S501, the control unit 101 initializes the continuous playback time, the registration elapsed time, and the playback position to 0.

The continuous playback time and the registration elapsed time have the following characteristics.

The continuous playback time is an index indicating how long normal mode playback continues to be executed.
The registration elapsed time indicates time elapsed after registration of viewpoint information.
According to the embodiment, the continuous playback time and registration elapsed time are managed in seconds. When the frame rate of a video is 30 fps and the playback device displays 30 images, the rate is incremented by 1.
When the playback position is changed to a location temporally separated by user operation, the continuous playback time and the registered elapsed time are reinitialized to 0. Change of the playback position refers to the operation of playing back an image using the seek bar 304 from a temporally separated location. The playback position and the continuous playback time are similarly managed in seconds.

In S502, the control unit 101 receives user operation information from the operation unit 102 and caries out processing corresponding to the user operation. The user operation which can be carried out in S502 includes the following kinds of operation.

To stop normal mode playback (the stop button 303).
To operate the seek bar (the seek bar 304).
To change the viewing direction (the cross button 305).

In step S503, the control unit 101 determines whether to continue the normal mode playback on the basis of the information received in S502. If the operation of stopping normal mode playback (the stop button 303) is included in the information received in S502, the control unit determines not to continue and stops the normal mode playback, ending the processing. If there is no operation of stopping continuance of the normal mode playback, the process proceeds to S504.

In S504, the control unit 101 obtains the current viewing direction. The control unit 101 writes the obtained viewing direction in the RAM 104. The viewing direction can be changed by operation to the cross button 305 as described above. If the operation to the cross button 305 has been accepted in S502, the viewing direction is updated in response to the accepted operation. In the process of VR display (as the processing for normal mode playback in S405 is executed during the VR display of a VR video at a normal mod playback speed), the viewing direction is updated to a viewing direction according to the attitude detected by the attitude detecting unit 107. Note that in normal mode playback which is not carried out by VR display, the view point can be changed in response to user operation to the operation unit (operation to the cross button 305) though the viewing direction is not changed according to a attitude detected by the attitude detecting unit 107. In S504, in the presence of the updating, the viewing direction is a viewing direction on which the updating is reflected or otherwise the newest viewing direction (the current viewing direction) which is the same as the viewing direction in the previous frame is obtained.

In S505, the control unit 101 obtains the current playback position. The control unit 101 writes the obtained current playback position in the RAM 104. During the normal mode playback, the current playback position is updated over time at a playback speed for normal mode playback unless there is operation to the seek bar 304. In S505, the updated newest playback position (the current playback position) is obtained.

In S506, the control unit 101 determines, on the basis of the current playback position obtained in S505, whether the user has carried out the operation of changing the playback position in S502. The playback position is continuously incremented if there is no operation carried out by the user. Therefore, the control unit 101 compares the difference between the playback position obtained in S505 and the playback position before the obtaining the position, and determines that the playback position has been changed if the difference is not less than a threshold. For example, when the threshold is set to 10 seconds, the playback position before the obtaining operation corresponds to 0 seconds, and the playback position obtained in S505 corresponds to 20 seconds, the difference in the playback position (20 seconds) is greater than the threshold (10 seconds), it is determined that the playback position has been changed. Note that instead of the determination on the basis of the playback position, it may be determined as Yes in S506 if there is operation to the seek bar 304 in the determination in S502.

If there is no change in the playback position, the continuous playback time and the registration elapsed time are updated in step S507. If the frame rate is 30 fps, $\frac{1}{30}$ is added to the continuous playback time and the registration elapsed time. If there is a change in the playback position, the continuous playback time and the registration elapsed time are initialized to 0 in S508.

In S509, the control unit 101 determines if the continuous playback time exceeds N seconds as the threshold and the registration elapsed time exceeds M seconds as the threshold. If these conditions are not satisfied, the process proceeds to S511. If these conditions are satisfied, the process proceeds to S510.

In S510, the control unit 101 records the viewpoint information (the viewing direction and the playback position) for a corresponding user ID in the user information management unit 106 on the basis of the user ID (obtained in S400 in FIG. 4) stored in the RAM 104, the viewing direction obtained in S504, and the current playback position obtained in S505.

Figure 6A:
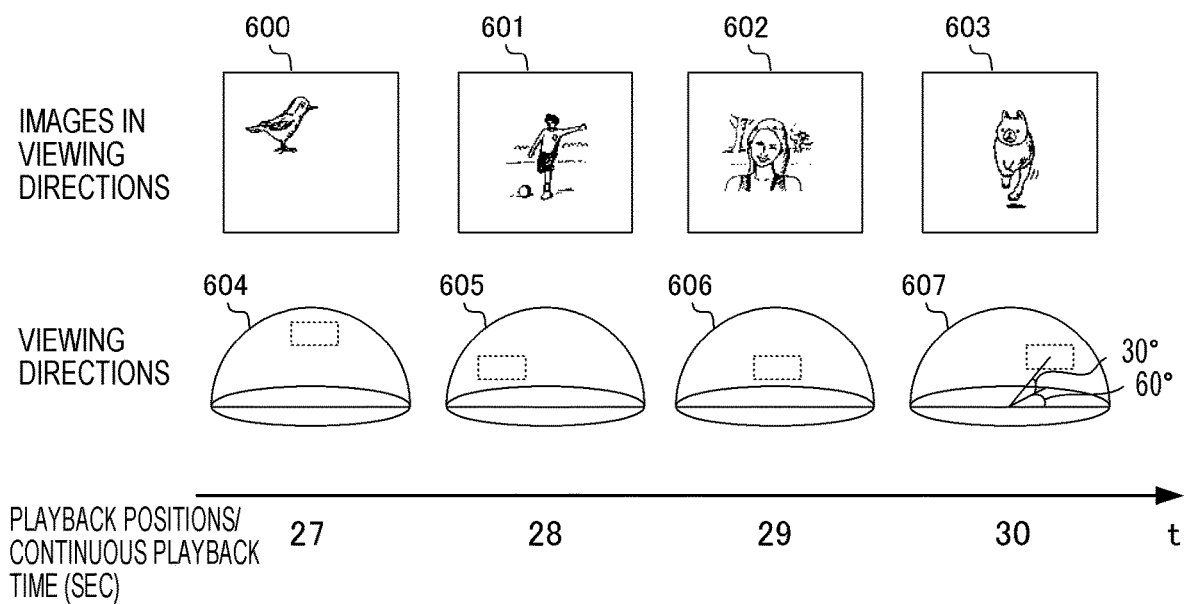
FIG. 6A is a view illustrating exemplary normal mode playback.

The processing of recording the view point information in S509 and S510 will be described in detail with reference to FIG. 6A. FIG. 6A is a chart for illustrating a video frame transition during normal mode playback and the viewing direction at the time along the time axis.

Reference numerals 600 to 603 designate display examples at the display unit 103. Reference numerals 604 to 607 illustrate viewing directions in a spherical coordinate system by dotted-line frames as the display examples 600 to 603 are displayed. The display example 600 corresponds to a display range (view field range) of the original image of the video in the dotted line frame in the viewing direction 604 extracted at the playback position at 27 seconds and displayed at the display unit 103. Similarly, the display example 601 corresponds to a display range in the viewing direction 605 extracted at the playback position at 28 seconds and displayed, and the display example 602 corresponds to a display range in the viewing direction 606 extracted at a playback position at 29 seconds and displayed. The display example 603 corresponds to a display range in the viewing direction 607 extracted at a playback position at 30 seconds and displayed.

When, for example, the threshold N used in S509 is 29 seconds, the threshold M is 10 seconds, the continuous playback time and the playback position are 30 seconds, and the registration elapsed time is 11 seconds, the following relations:

"Threshold N<continuous playback time", and

"Threshold M<registration elapsed time"

are established. Therefore, in S510, the control unit 101 records viewpoint information in the user information management unit 106. In S510, a playback position at 30 seconds, and an elevation angle $\phi$ of 30° and an azimuth angle $\theta$ of 60° in the viewing direction 607 at the time are recorded as information. When the viewpoint information at the same playback position is already recorded, the viewpoint information overwrites the previous information. The registration elapsed time is initialized to 0.

The viewpoint information (the viewing direction and the playback position) can be recorded at intervals of M seconds by carrying out the above-described processing.

In S511, the control unit 101 determines an image frame to be decoded on the basis of the playback position information obtained in S505 and stored in the RAM 104, reads out the image (the original image) of the determined frame from the recording medium 105, decodes the image and writes the image in the RAM 104.

In step S512, the control unit 101 determines an image range to be displayed in the image written in the RAM 104 on the basis of the elevation angle $\phi$ and the azimuth angle $\theta$ in the current viewing direction (obtained in S504) stored in the RAM 104. When for example the original image (image data) to be played back is an image produced by the equidistant cylindrical projection, the original image is distorted from a video in a real world. In the image produced by the equidistant cylindrical projection, the position of each pixel may be associated with coordinates at the surface of the sphere. In S512, the original image is mapped to the sphere, and a part thereof is extracted and displayed. More specifically, the image displayed in S512 is an image obtained by extracting and enlarging a part of the original image and removed of the distortion in the original image (or with reduced distortion). The control unit 101 instructs the display unit 103 to display the determined image range. After the display unit 103 displays the image, the process returns to S502, and the control unit 101 again accepts user operation. The processing from S502 to S512 is carried out at intervals of the frame rate of the video. More specifically, when the rate is 30 fps, the display updating processing in S512 is carried out once every $\frac{1}{30}$ seconds.

Processing Routine for Search Mode Playback

Figure 7:
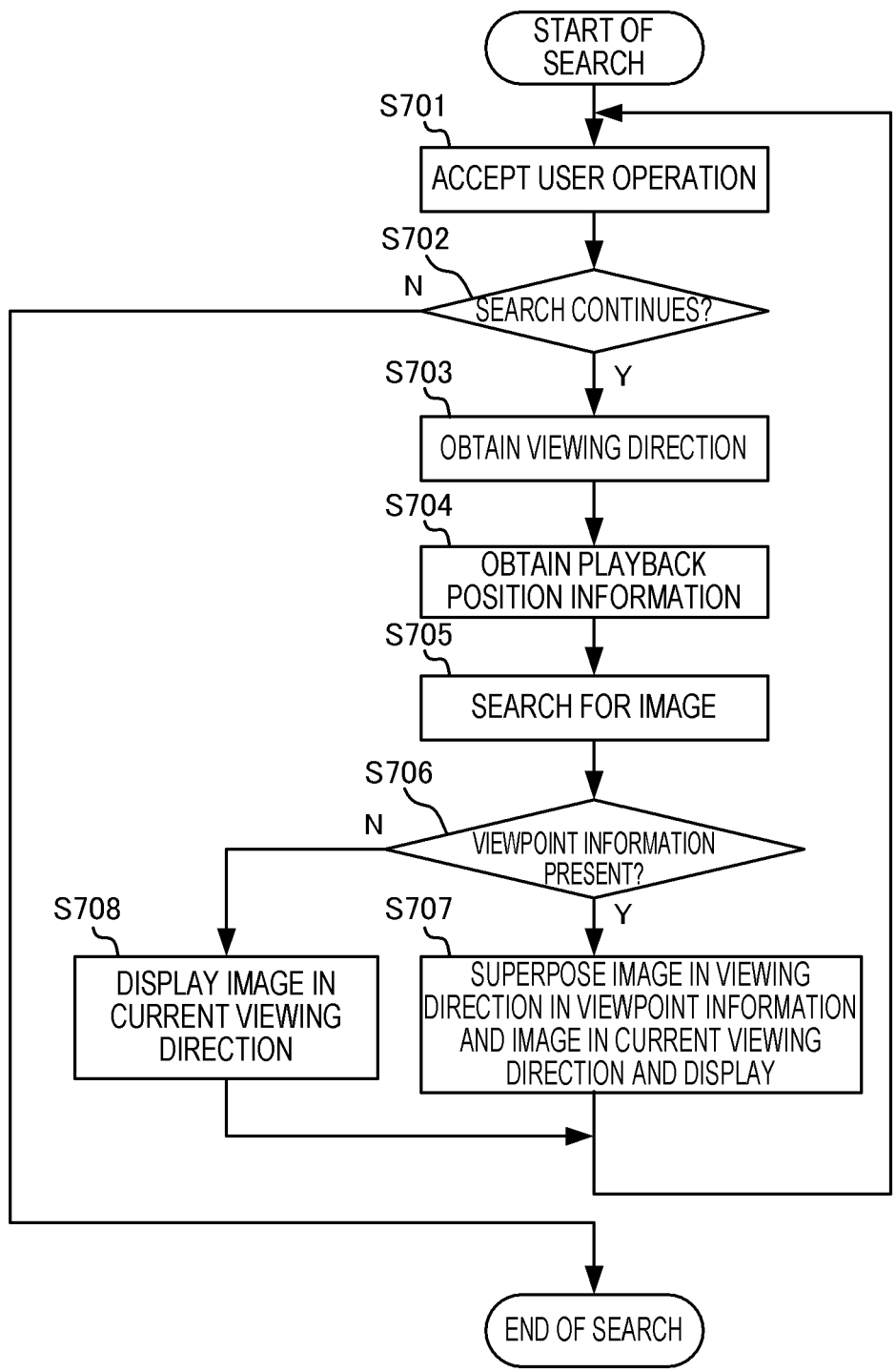
FIG. 7 is a flowchart for illustrating a processing routine for search mode playback according to the first embodiment.

Now, the processing routine for search mode playback will be described with reference to FIG. 7.

In S701, the control unit 101 receives user operation information from the operation unit 102 and executes processing according to the user operation. The user operation which can be carried out in S701 includes the following kinds of operation.

To stop search mode playback (the stop button 303)
To operate the seek bar (the seek bar 304)
To change the viewing direction (the cross button 305)

In S702, the control unit 101 determines whether to continue search mode playback on the basis of the information received in S502 in FIG. 5. In response to the operation of stopping the search mode playback (operation of the stop button 303), or the operation of switching to normal mode playback (operation of the playback button 301), the search mode playback ends and the processing in FIG. 7 ends. If there is no such operation to end search mode playback, the process proceeds to S703. Note that the viewing direction in a video to be subjected to search mode play back can arbitrarily be set by the user using the cross button 305.

The processing in S703, S704, and S705 is the same as the processing in S504, S505, and S511 in FIG. 5, and therefore the description will not be repeated. Note that the playback position in S704 is based on the playback position based on a playback speed in search mode playback rather than on the same playback speed as normal mode playback if the updating is based on elapsed time rather than on operation to the seek bar 304. For example, in normal mode playback at 30 fps, the playback position advances by one frame for every 1/30 seconds, while in search mode playback at a speed five times as fast, the playback position advances by five frames for every 1/30 seconds.

In S706, the control unit 101 determines whether the viewpoint information corresponding to the current playback position obtained in S704 is stored in the user information management unit 106. More specifically, the control unit 101 reads all the pieces of viewpoint information of the current user to the RAM 104 on the basis of the user ID of the current user stored in the RAM 104. Then, the control unit 101 determines whether there is viewpoint information corresponding to the current playback position obtained in S704 in the pieces of viewpoint information of the current user written in the RAM 104. According to the embodiment, the control unit 101 determines that "corresponding viewpoint information is present" if the viewpoint information in the playback position completely in coincidence with the current playback position is present. Note however that instead of the determination method, viewpoint information in a substantially identical playback position (where the difference in the playback position is less than a threshold (such as 0.5 seconds)) may be selected as the "corresponding viewpoint information."

If the corresponding viewpoint information is present, the process proceeds to S707. In S707, the control unit 101 instructs the display unit 103 to superpose an image in a viewing direction included in the corresponding viewpoint information on an image in the current viewing direction obtained in S703 and display the result. Meanwhile, if there is no corresponding viewpoint information, the process proceeds to S708. The processing in S708 is the same as the processing in S512 in FIG. 5, and therefore the description will not be repeated.

Figure 6B:
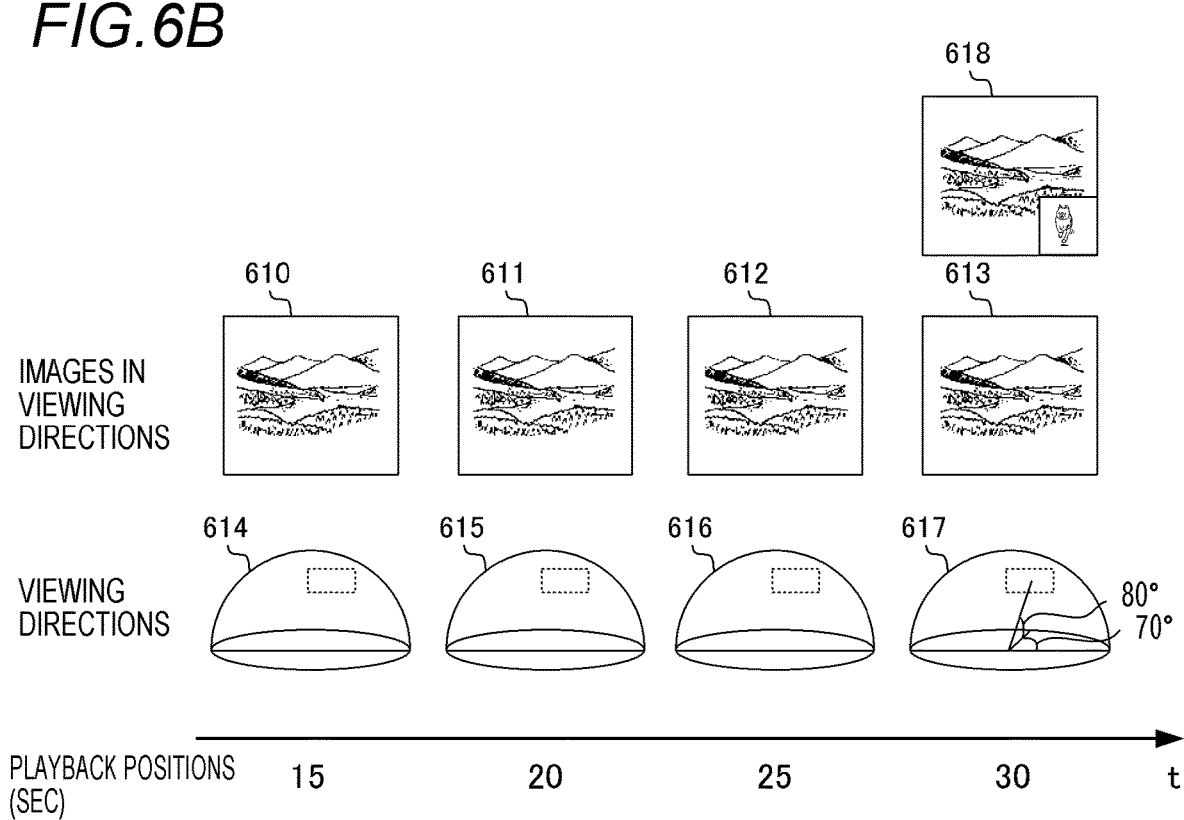
FIG. 6B is a view illustrating exemplary search mode playback.

The processing in S706 to S708 will be described in detail with reference to FIG. 6B. FIG. 6B is a chart for illustrating a video frame transition during search mode playback and viewing directions during the time along the time axis.

Reference numerals 610 to 613 designate display examples at the display unit 103. Reference numerals 614 to 617 illustrate viewing directions in a spherical coordinate system by dotted-line frames as the display examples 610 to 613 are displayed. The display example 610 corresponds to a display range (a view field range) of an image in the original video in the dotted line frame in the viewing direction 614 extracted at a playback position at 15 seconds and displayed at the display unit 103. Note that "15 seconds" is a time code for indicating a playback position "displayed 15 seconds after the start when the image is played back at a playback speed in normal mode playback" and is different from time required for the image in the frame to be displayed when the image is played back from the start by search mode playback.

Similarly, the display example 611 corresponds to a display range in the viewing direction 615 extracted at the playback position at 20 seconds and displayed, and the display example 612 corresponds to a display range in the viewing direction 616 extracted at a playback position at 25 seconds and displayed. The display example 613 corresponds to a display range in the viewing direction 617 extracted at a playback position at 30 seconds and displayed.

FIG. 6B is a chart illustrating the case with no change in the viewing direction during search mode playback. More specifically, the viewing direction ($\phi=80°$, $\theta=$) 70° is unchanged and an image in the same view field is displayed during the period from the playback positions at 15 seconds to 30 seconds. If there is no corresponding viewpoint information (NO in S706), in S708, the image in the current viewing direction is displayed at the display unit 103 as in the display examples 610 to 612. In contrast, when corresponding viewpoint information is present (YES in S706), in S707, an image produced by superposing an image in the current viewing direction with an image (see 603 in FIG. 6A) in the display range in the viewing direction 607 included in the viewpoint information is displayed as in the display example 618. In this way, the viewing direction in the video being currently played back by search mode playback can be set independently from the viewing direction used for playing back the same video on a previous occasion, and therefore different images are displayed in the same position as in the display examples 603 and 613.

Now, using the following specific example, the processing in S706 and S707 will be described in detail.

Assume that the user ID of the current user is "aaa."

The user information management unit 106 stores, as viewpoint information on the user ID (aaa), the viewing direction 607 ($\phi=30°$ and $\theta=60°$) in FIG. 6A and the playback position (30 seconds) at the time (FIG. 8).

In search mode playback, the current viewing direction obtained in S703 is ($\phi=80°$ and $\theta=70°$), and the current playback position obtained in S704 corresponds to 30 seconds.

In S706, the control unit 101 determines whether the viewpoint information on the current user at the playback position at 30 seconds is recorded in the user information management unit 106. More specifically, the control unit 101 reads all the pieces of viewpoint information associated with the user ID: aaa to the RAM 104 from the user information management unit 106. Then, the control unit 101 determines whether there is viewpoint information corresponding to the playback position at 30 seconds among the pieces of viewpoint information about the user ID: aaa written in the RAM 104. Since the viewpoint information in FIG. 8 is viewpoint information at the playback position at 30 seconds, the process proceeds to S707.

In S707, the control unit 101 reads out a frame image at the playback position at 30 seconds from the recording medium 105 and decodes and writes the image in the RAM 104. The control unit 101 obtains, from the images written in the RAM 104, an image in the display range corresponding to the viewing direction ($\phi=30°$ and $\theta=$) 60° included in the viewpoint information and an image in the display range corresponding to the current viewing direction ($\phi=80°$ and $\theta=70°$) obtained in S703. Then, the control unit 101 superposes the image in the display range corresponding to the viewing direction included in the viewpoint information (in other words, a viewing direction on a past playback occasion) on the image in the display range corresponding to the current viewing direction and displays the resulting image at the display unit 103. At the time, the image in the display range corresponding to the viewing direction on the past playback occasion may be reduced in size and superposed on the image in the display range corresponding to the current viewing direction. As a result, a composite image as in the display example 618 in FIG. 6B is displayed at the display unit 103. In the lower right part of the display example 618, the image in the display range corresponding to the viewing direction on the past playback occasion is displayed in a picture-in-picture arrangement under the image in the display range corresponding to the current viewing direction.

In a multi-viewpoint video, the user can arbitrarily switch the viewing direction while viewing the video. Therefore, if the user wants to view the same scene once again later, it is not be easy to find the exact scene (a combination of a playback position and a viewing direction) from the video. This is because, as shown in FIGS. 6A and 6B, in a multi-viewpoint video, totally different images (603 and 613) may be displayed for the same playback position (30 seconds) if the viewing directions are different, and it is highly likely that the user overlooks the desired scene. In particular, when the user has frequently switched the viewing direction on the past viewing occasion, it would be next to impossible to find out the exact scene viewed in the past only depending on the user's memory.

In contrast, by the display control according to the embodiment, the image in the display range viewed by the user on the past video playback occasion can automatically be presented to the user. Therefore, the user can search for a scene viewed in the past easily and effectively. Also according to the embodiment, as an image in the viewing direction on the past playback occasion is superposed on a part of the image in the current viewing direction, so that the user can be informed of the viewing direction on the past playback occasion without being prevented from viewing the image in the current viewing direction.

According to the embodiment, as in S402 and S403 in FIG. 4, it is determined whether to update the viewpoint information on the basis of whether it is immediately after turning on of the power supply, but the viewpoint information may be deleted by any other processing routine. Now, a processing routine other than the viewpoint information updating processing will be described with reference to FIGS. 9A to 9C. The processing routine in FIGS. 9A to 9C is a processing routine as a substitute for S402 and S403 in FIG. 4.

Deletion Upon Switching of Video Files

With reference to FIG. 9A, a method for deleting recorded viewpoint information when the video file to be played back is changed will be described. Upon accepting user operation in S401 in FIG. 4, the process proceeds to S901. In S901, the control unit 101 determines whether the operation accepted in S401 in FIG. 4 is selection of a video file. If the accepted operation in S401 in FIG. 4 is selection of a video file, the process proceeds to S902. If the operation accepted in S401 is not selection of a video file, the process proceeds to S404 in FIG. 4.

In S902, the control unit 101 determines whether the video file selected in S401 in FIG. 4 is different from the previously played back video file. If the video file selected in S401 is different from the previously played back video file, the process proceeds to S903. If the video file selected in S401 is the same as the previously played back video file, the process proceeds to S404 in FIG. 4. In S903, the control unit 101 deletes the viewpoint information recorded in the user information management unit 106. The processing in S903 is the same as the processing in S403 in FIG. 4, and therefore the description will not be repeated.

As a result of the foregoing processing, the viewpoint information is automatically deleted in timing for switching the files to be played back.

Deletion Upon User Switching

With reference to FIG. 9B, a method for deleting recorded viewpoint information when the user operating the playback device 100 changes will be described. Upon receiving user operation in S401 in FIG. 4, the process proceeds to S910. In S910, the control unit 101 determines whether the user ID set in S400 in FIG. 4 is different from the previously set user ID. If the user IDs are different, the process proceeds to S911. If the user IDs are the same, the process proceeds to S404 in FIG. 4.

In S911, the control unit 101 deletes the viewpoint information recorded in the user information management unit 106. The processing in S911 is the same as the processing in S403 in FIG. 4, and therefore the description will not be repeated. As a result of the foregoing processing, the viewpoint information is automatically deleted in timing for switching the users.

Deletion Per User Operation

With reference to FIG. 9C, a method for deleting the viewpoint information every time user operation is accepted will be described. Upon accepting user operation in S401 in FIG. 4, the process proceeds to S920. In S920, the control unit 101 deletes the viewpoint information recorded in the user information management unit 106. (Note however that the viewpoint information is not deleted for user operation for search mode playback.) As a result of the foregoing processing, the viewpoint information is automatically deleted every time user operation such as stopping of a video being played back, change of a video file to be played back, instruction for normal mode playback, and operation of the seek bar is accepted.

Second Embodiment

According to a second embodiment of the invention, when continuous playback time is less than predetermined time in playback of a multi-viewpoint video, an image in the current viewing direction and an image in a viewing direction on a past playback occasion are displayed together by way of illustration. Since the configuration of the playback device and the processing routine for the entire playback device are the same as those according to the first embodiment (see FIGS. 1 and 4), the description will not be repeated, and aspects unique to the second embodiment will mainly be described.

FIG. 10 is a flowchart for illustrating a part of a processing routine for normal mode playback according to the embodiment. The processing routine in FIG. 10 is substitute processing for S512 in FIG. 5. The processing in S501 to S511 in FIG. 5 is carried out also according to the embodiment, and the process proceeds to S1001 in FIG. 10 following S511. In S1001, the control unit 101 determines whether viewpoint information corresponding to the current playback position obtained in S504 is recorded in the user information management unit 106. Specific processing in S1001 is the same as the processing in S706 in FIG. 7. If there is corresponding viewpoint information, the process proceeds to S1002. If there is no corresponding viewpoint information, the process proceeds to S1004. The processing in S1004 is the same as the processing in S708 in FIG. 7, and therefore the description will not be repeated.

In S1002, the control unit 101 determines whether the continuous playback time (time elapsed after the start of playback of a video) is less than a threshold M. If the continuous playback time is less than the threshold M, the process proceeds to S1003. If the continuous playback time is not less than the threshold M, the process proceeds to S1004. In S1003, the control unit 101 instructs the display unit 103 to superpose the image in the viewing direction included in the corresponding viewpoint information on the image in the current viewing direction obtained in S504 and display the resulting image. Specific processing in S1003 is the same as the processing in S707 in FIG. 7.

In the display control according to the embodiment described above, in the period in which the continuous playback time is less than the threshold M, an image in a viewing direction on a past viewing occasion (a second video) is superposed on an image in the current viewing direction (a first image) and displayed. When for example the threshold M is set to 11 seconds, and the playback position is changed for example in response to seek bar operation, the image in the viewing direction on the past viewing occasion is superposed and displayed for about 10 seconds after the change (if there is corresponding viewpoint information).

When the playback position jumps by the seek bar, it may be difficult for the user to determine which scene is the current playback scene immediately after the jumping. According to the embodiment, in the state immediately after the playback position is changed by operating the seek bar, in other words, when the continuous playback time is less than the threshold, an image in a viewing direction on a previous viewing occasion is displayed together, which allows the user to more easily determine the playback position of the current scene.

Note that if the condition in which the continuous playback time is less than the threshold M (a first condition) is not satisfied, an image in a viewing direction on a past viewing occasion (a second video) and an image in the current viewing direction (a first video) may be displayed together. The image in the current viewing direction (the first video) is a video extracted irrespectively of information on the previous viewing directions managed by the user information management unit 106. The method for displaying the first and second videos together is not limited to the superposition display, and these videos may be displayed at a time in separate display regions as videos for the same playback position.

If the continuous playback time does not satisfy the first condition or if the continuous playback time satisfies the first condition and information on previous viewing directions managed by the user information management unit 106 satisfies a particular condition (a second condition), a second video may be displayed or otherwise the video may not be displayed. For example, when the previous viewing direction information managed by the user information management unit 106 corresponding to the current playback time additionally includes particular attribute information such as a favorite viewing direction or a viewing direction provided with a comment, the second video is displayed together with the first video. Otherwise, the first video is displayed but the second video is not.

Third Embodiment

According to a third embodiment of the invention, when the user operation of touching the seek bar is carried out in playback of a multi-viewpoint video, an image in the current viewing direction in a touched playback position and an image in a viewing direction on a previous playback occasion are displayed together by way of illustration. The configuration of the playback device and the processing routine for the entire playback device are the same as those of the first embodiment (see FIGS. 1 and 4), therefore the description will not be repeated, and aspects unique to the third embodiment will mainly be described.

Figure 11:
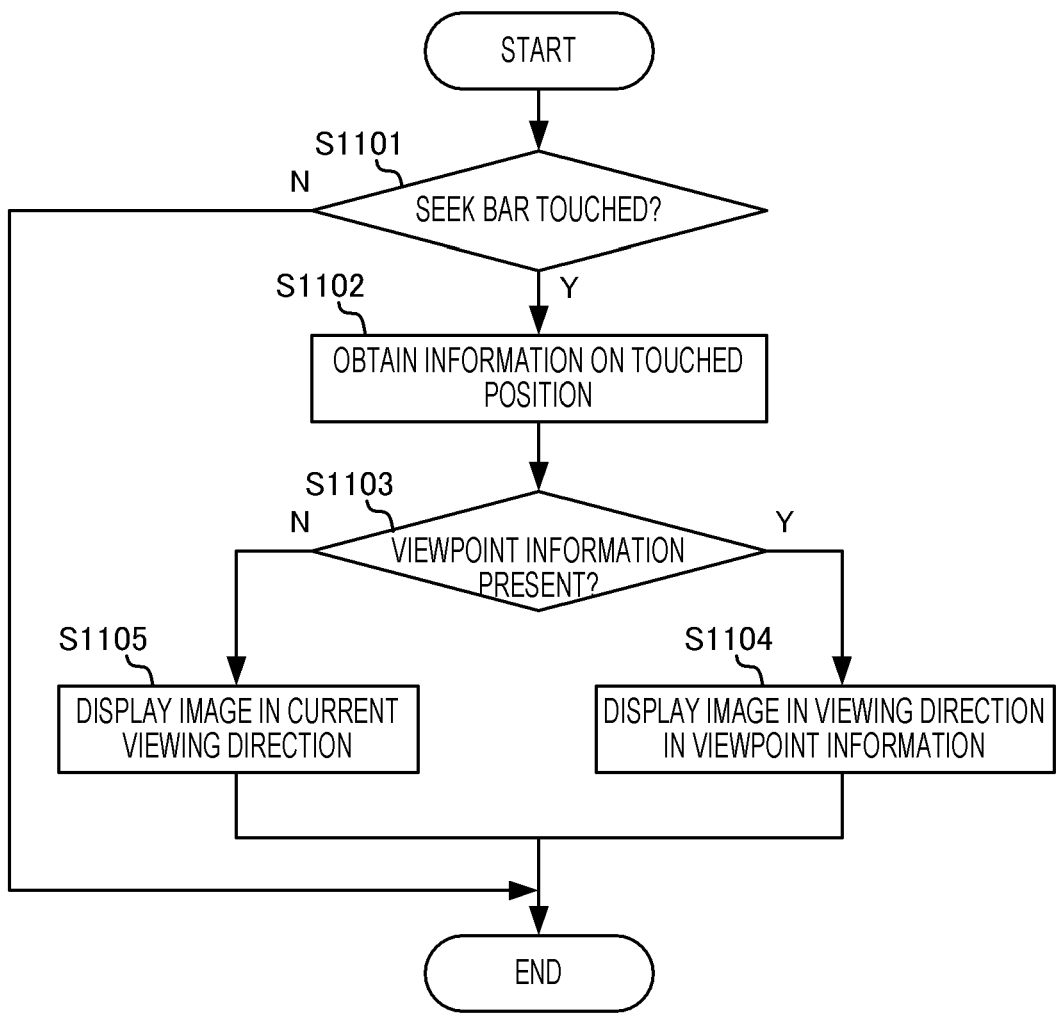
FIG. 11 is a flowchart for illustrating a processing routine in response to touching on a seek bar according to a third embodiment of the present invention.

FIG. 11 shows a processing routine carried out upon accepting the user operation of touching the seek bar in the user operation accepting operation in S502 in FIG. 5 or S701 in FIG. 7 described in connection with the first embodiment. Hereinafter, the processing routine in FIG. 11 will be described by referring to an example in which the length of the entire video is 60 seconds, and a playback position at 30 seconds and a viewing direction ($\phi=30°$ and $\theta=60°$) are recorded as viewpoint information.

In S1101, the control unit 101 determines whether the operation of touching the seek bar 304 has been carried out. If the operation of touching the seek bar is accepted, the process proceeds to S1102. If there is no seek bar touching operation, the processing ends.

In S1102, the control unit 101 receives information on the position on the seek bar touched by the user from the operation unit 102. The information on the position on the seek bar indicates the position of how many seconds in the video the position corresponds to.

Figure 12:
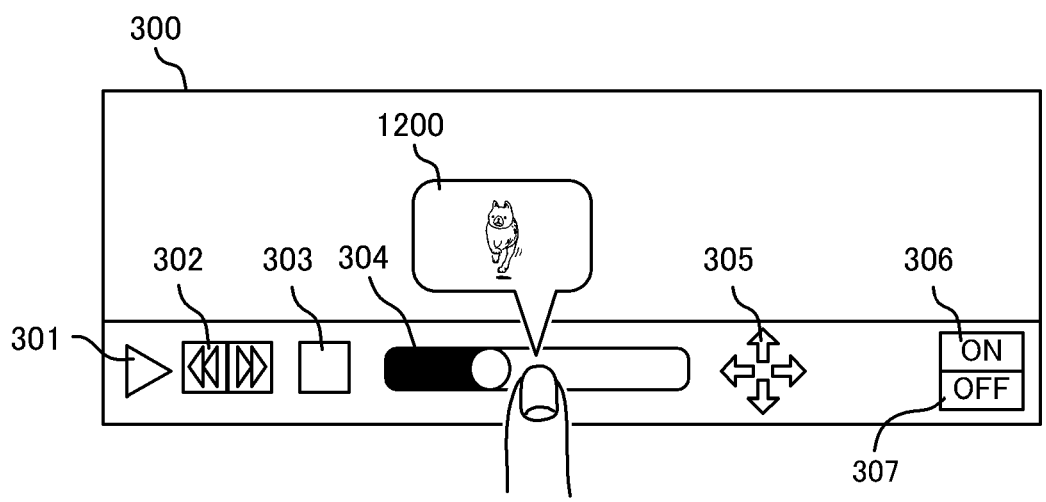
FIG. 12 is a view illustrating an exemplary seek bar according to the third embodiment when the seek bar is touched.

FIG. 12 shows a state in which the seek bar is touched. In this example, it is assumed that the user touches the position exactly in the center of the seek bar 304. Therefore, in this example, the position information on the seek bar obtained in S1102 corresponds to 30 seconds (the position corresponding to the middle of the entire video).

In S1103, the control unit 101 determines whether viewpoint information corresponding to the position obtained in S1102 (30 seconds in this example) is recorded in the user information management unit 106. Specific processing in S1103 is the same as that in S706 in FIG. 7, and therefore the description will not be repeated. If the corresponding viewpoint information is present, the process proceeds to S1104. If no corresponding viewpoint information is present, the process proceeds to S1105.

The position obtained in S1102 corresponds to 30 seconds, the viewpoint information in the playback position at 30 seconds is recorded, and therefore S1104 is executed in this example. In S1104, the control unit 101 displays an image in the viewing direction included in the corresponding viewpoint information. More specifically, the control unit 101 changes the current viewing direction (or a set value for the viewing direction to be displayed) to the viewing direction included in the viewpoint information obtained in S1103 from the viewing direction viewed before the seek bar operation. Then, the control unit 101 carries out the same processing as that in S511 and S512 in FIG. 5. As a result, the image in the same viewing direction as that viewed by the user in the playback position at 30 seconds on the past viewing occasion is displayed. At the time, the image may be displayed in the main display region of the display unit 103 or as a reduced image 1200 in the vicinity of the position touched by the user as shown in FIG. 12. In the latter case, after the user ends the touching operation and the playback position after the change is determined, the current viewing direction and the image in the main display region may be changed.

If it is determined in S1103 that there is no corresponding viewpoint information, the control unit 101 displays the image in the playback position at 30 seconds in S1105 while maintaining the current viewing direction. The routine for displaying the image is the same as that in S511 and S512 in FIG. 5 and therefore the description will not be repeated.

By the display control according to the embodiment described above, when the user touches the seek bar in normal mode playback (and if corresponding viewpoint information is present), an image in a viewing direction on a past viewing occasion is displayed.

For example, it is assumed that the user may want to view a previously viewed scene once again and try to find the desired scene by touching the seek bar. It is relatively easy to find such a previously viewed scene in a video with an unchanged viewing direction. (In other words, in a video in which an image to be displayed can be determined by determining a playback position.) However, in a multi-viewpoint video as in the description of the embodiment, images to be displayed are different depending on a set viewing direction even if a playback position is determined. Therefore, when the seek bar is used to change the playback position, and an image in a viewing direction different from the previous viewing occasion is displayed, it may be difficult for the user to determine if the jumped destination is the desired scene.

Therefore, according to the embodiment, when seek bar touching operation is carried out, an image in the viewing direction viewed by the user in the past in the playback position corresponding to the touched position is displayed. In this way, the user may determine the scene in advance or find the desired scene before changing the playback position. Note that according to the embodiment, only the image in the past viewing direction is displayed in S1104, but both the images in the past and current viewing directions may be displayed similarly to the first embodiment.

Modifications

According to the embodiments, viewpoint information is recorded at predetermined time intervals (every M seconds) while a multi-viewpoint video is played back, but the timing for recording viewpoint information is not limited to the above. For example, viewpoint information may be recorded every time user operation for changing the viewing direction is accepted, or viewpoint information may be recorded in timing of scene changes or between chapters in a video. According to the embodiments, the viewing direction (the elevation angle and the azimuth angle) and the playback position (time elapsed from the start of the video) are recorded as the viewpoint information, but information recorded as the viewpoint information is not limited thereto. Any type of information may be recorded as long as a viewing direction when the user viewed the video in the past can be reproduced. For example, the viewing direction may be specified using a coordinate system other than the celestial coordinate system, or the viewing direction may be recorded in association with an "interval played back in the same viewing direction (for example the time for the starting frame and the time for the ending frame)" instead of the "playback position (time for one frame)."

According to the embodiments, a user viewing a video (or operating the device) is identified, and viewpoint information is recorded for every user, while it is not essential to identify a user or control a viewpoint on a user basis. When users who use an electronic device are limited (for example when only one or a few limited users use a smart phone or home equipment), it may not be necessary to associate viewpoint information with the users.

Note that the various kinds of control carried out by the control unit 101 in the foregoing description may be carried out by one kind of hardware or the tasks of the processing may be shared among multiple kinds of hardware (such as a plurality of processors or circuits) to carry out overall control of the device.

While the present invention has been described in detail with reference to the preferred embodiments, these particular embodiments are not intended to limit the present invention, and various modifications without departing the gist of the present invention will fall within the scope of the present invention. The embodiments have been described only by way of illustrating examples of the present invention, and the embodiments may be combined as appropriate.

In the description of the embodiments, the present invention is applied to a playback device by way of illustration, but the same should not be construed as limiting and the invention may be applied to any electrical device capable of playing back a multi-viewpoint video. More specifically, the present invention may be applied to a personal computer, a PDA, a mobile phone, a portable image viewer, a printer apparatus including a display, a digital photo frame, a music player, a game machine, an electronic book reader, etc. The present invention may also be applied to a display capable of playing back a video, a video player, a digital camera, a digital video camera, a video editor, a smart phone, a tablet PC, etc. The present invention may also be applied to an electronic device without a display. For example, the electronic device may carry out processing including reading a multi-viewpoint video, producing display data, and recording viewpoint information and output the display data to an externally provided display.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-069499, filed on Mar. 30, 2018, which is hereby incorporated by reference herein in its entirety.

What is claimed is:

1. An electronic device comprising a memory and at least one processor and/or at least one circuit to perform the operations of the following units:
   a playback unit configured to play back a viewing-direction-changeable moving image;
   a management unit configured to store viewpoint information as a record of a viewing direction used by the playback unit in playing back the moving image; and
   a control unit configured
      to carry out control so that a range of the moving image including a viewing direction identical to a viewing direction on a previous playback occasion is extracted and displayed based on the viewpoint information stored in the management unit, in response to predetermined user operation (i) different from an instruction for playback at a normal speed and (ii) related to (a) playback of the moving image or (b) specification of a playback position in the moving image, and
      to carry out control so that the displaying the range based on the viewpoint information is not performed in response to an instruction for playback at the normal speed.

2. The electronic device according to claim 1, wherein the predetermined operation includes operation for instructing playback of the moving image at a higher speed than the normal speed.

3. The electronic device according to claim 1, wherein the predetermined operation includes operation to a seek bar.

4. The electronic device according to claim 3, wherein the control unit carries out control so that the range based on the viewpoint information is displayed during a predetermined period after a change of the playback position in response to the operation to the seek bar.

5. The electronic device according to claim 1, wherein the predetermined operation includes operation for specifying a playback position different from a current playback position with respect to the moving image in process of playback by the playback unit.

6. The electronic device according to claim 1, wherein the control unit carries out control so that the range based on the viewpoint information is displayed together with a display range of the moving image currently in process of playback extracted irrespectively of the viewpoint information.

7. The electronic device according to claim 1, wherein the management unit stores the viewpoint information in association with the user, and
   using the viewpoint information associated with the user inputting the predetermined operation in the viewpoint information stored in the management unit, the control unit carries out control so that a range of the moving image including a viewing direction identical to a viewing direction on a previous playback occasion by the user inputting the predetermined operation is extracted and displayed.

8. The electronic device according to claim 1, wherein the management unit records a viewing direction at a predetermined time interval while the moving image is played back.

9. The electronic device according to claim 1, wherein the management unit stores the viewpoint information in association with a playback position in the moving image, and
   using viewpoint information associated with a playback position in the moving image currently in process of playback in the viewpoint information stored in the management unit, the control unit carries out control so that a range of the moving image including a viewing direction identical to a viewing direction on a previous playback occasion is extracted and displayed.

10. The electronic device according to claim 1, wherein the management unit deletes the stored viewpoint information when the moving image to be played back by the playback unit is changed.

11. The electronic device according to claim 1, wherein the management unit deletes the stored viewpoint information when the user who operates the electronic device is changed.

12. The electronic device according to claim 1, wherein the management unit deletes the stored viewpoint information when playback of the moving image by the playback unit ends.

13. A non-transitory computer-readable storage medium storing a program for causing a computer to function as each of the units of the electronic device according to claim 1.

14. A method for controlling an electronic device, comprising:
   playing back a viewing-direction-changeable moving image;
   recording a viewing direction used in playing back the moving image and storing the viewing direction as viewpoint information in a storage unit; and
   in response to predetermined user operation (i) different from an instruction for playback at a normal speed and (ii) related to (a) playback of the moving image or (b) specification of a playback position in the moving image, carrying out control so that a range of the moving image including a viewing direction identical to a viewing direction on a previous playback occasion is extracted and displayed based on the viewpoint information stored in the storage unit,
   wherein the displaying the range based on the viewpoint information is not performed in response to an instruction for playback at the normal speed.

* * * * *